US011698936B2

(12) United States Patent
Moore et al.

(10) Patent No.: US 11,698,936 B2
(45) Date of Patent: Jul. 11, 2023

(54) SYSTEM AND METHODS FOR SEARCH ENGINE PARAMETER TUNING USING GENETIC ALGORITHM

(71) Applicant: Home Depot Product Authority, LLC, Atlanta, GA (US)

(72) Inventors: Jared Moore, Atlanta, GA (US); Rongkai Zhao, Kildeer, IL (US); Ravi Sambhu, Alpharetta, GA (US); Naveen Krishna, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 482 days.

(21) Appl. No.: 15/727,917

(22) Filed: Oct. 9, 2017

(65) Prior Publication Data
US 2019/0108279 A1    Apr. 11, 2019

(51) Int. Cl.
*G06F 16/951* (2019.01)
*G06F 16/953* (2019.01)
*G06N 3/126* (2023.01)

(52) U.S. Cl.
CPC .......... *G06F 16/951* (2019.01); *G06F 16/953* (2019.01); *G06N 3/126* (2013.01)

(58) Field of Classification Search
CPC ...... G06F 16/951; G06F 16/953; G06N 3/126
USPC .......................................................... 706/13
See application file for complete search history.

(56) References Cited

U.S. PATENT DOCUMENTS

| | | | |
|---|---|---|---|
| 6,470,307 B1 * | 10/2002 | Turney | G06F 16/30 704/9 |
| 6,873,982 B1 | 3/2005 | Bates et al. | |
| 7,010,159 B2 | 3/2006 | Ali | |
| 7,243,102 B1 * | 7/2007 | Naam | G06F 16/334 |
| 7,640,236 B1 * | 12/2009 | Pogue | G06F 16/9535 |
| 7,716,218 B1 * | 5/2010 | Pogue | G06F 16/3325 707/728 |

(Continued)

FOREIGN PATENT DOCUMENTS

CA    2601768    8/2016

OTHER PUBLICATIONS

Elser, Jeffrey. Search Engine Tuning with Genetic Algorithm. Montana State University, May 2012 (Year: 2012).*

(Continued)

*Primary Examiner* — Alicia M Willoughby
(74) *Attorney, Agent, or Firm* — Greenherg Traurig, LLP

(57) ABSTRACT

A method for operating a search engine may include determining a multi-dimensional search parameter space comprising a set of possible weight values for each of a plurality of search parameters and dividing the search parameter space into a grid of evenly-spaced values that is a subset of the set of possible values. The method may further include defining one or more initial populations of search parameter weight values, wherein each population of search parameter weight values comprises a plurality of initial individuals, wherein each initial individual comprises a respective one of the evenly-spaced values for each of the search parameters. The method may further include executing one or more genetic algorithms based on the one or more initial populations to select a final set of search parameter weight values, and returning results of a user search in the search engine according to the final set of search parameter weight values.

18 Claims, 6 Drawing Sheets

(56) References Cited

U.S. PATENT DOCUMENTS

| | | | | |
|---|---|---|---|---|
| 8,620,904 | B2 * | 12/2013 | Tischer | F24F 6/043 |
| | | | | 707/722 |
| 8,639,643 | B2 | 1/2014 | Wu et al. | |
| 8,645,409 | B1 * | 2/2014 | Garg | G06F 16/242 |
| | | | | 707/769 |
| 8,730,817 | B2 | 5/2014 | Resende et al. | |
| 8,972,395 | B1 * | 3/2015 | Bottum | G06F 16/951 |
| | | | | 707/728 |
| 9,436,725 | B1 * | 9/2016 | Aithal | G06F 16/24 |
| 9,444,717 | B1 * | 9/2016 | Aithal | H04L 41/0897 |
| 9,501,575 | B2 | 11/2016 | Serdyukov et al. | |
| 9,535,960 | B2 | 1/2017 | Guo et al. | |
| 2003/0093408 | A1 * | 5/2003 | Brown | G06F 16/2272 |
| 2005/0004905 | A1 | 1/2005 | Dresden | |
| 2005/0197787 | A1 * | 9/2005 | Diedrich | G06N 3/126 |
| | | | | 702/20 |
| 2009/0276414 | A1 | 11/2009 | Gao et al. | |
| 2009/0279726 | A1 * | 11/2009 | Baskent | H04R 25/70 |
| | | | | 381/314 |
| 2010/0070498 | A1 * | 3/2010 | Zhang | G06Q 10/06 |
| | | | | 707/736 |
| 2010/0325131 | A1 | 12/2010 | Dumais et al. | |
| 2011/0004588 | A1 | 1/2011 | Leitersdorf et al. | |
| 2011/0173145 | A1 * | 7/2011 | Wu | G06F 16/353 |
| | | | | 706/13 |
| 2011/0307899 | A1 * | 12/2011 | Lee | G06F 9/5027 |
| | | | | 718/104 |
| 2013/0185234 | A1 * | 7/2013 | Arora | G06N 3/126 |
| | | | | 706/13 |
| 2015/0012512 | A1 * | 1/2015 | Lam | G06F 16/248 |
| | | | | 707/706 |
| 2015/0134315 | A1 * | 5/2015 | Sarmiento | C12N 15/1058 |
| | | | | 703/11 |
| 2015/0229728 | A1 * | 8/2015 | Savolainen | H04L 67/025 |
| | | | | 707/722 |
| 2016/0283489 | A1 | 9/2016 | Uy et al. | |
| 2018/0107696 | A1 * | 4/2018 | Moscibroda | G06F 16/24553 |
| 2019/0080240 | A1 * | 3/2019 | Andoni | G06N 3/086 |
| 2019/0087472 | A1 * | 3/2019 | Dong | G06F 16/3326 |

OTHER PUBLICATIONS

Varpa, Kirsi et al. Genetic Algorithm Based Approach in Attribute Weighting for a Medical Data Set. Hindawi, 2014 (Year: 2014).*

Xu, Weifeng et al. Application of Genetic Algorithm in Search Engine. IEEE, 2000 (Year: 2000).*

International Search Report and Written Opinion received re International Application No. PCT/US2017/055748, dated Dec. 15, 2017, 15 pgs.

Kumar, Naresh and Singh, Praveer, Meta Search Engine with Semantic Analysis and Query Processing, http://www.ripublication.com/ijcir17/ijcirv13n8_14.pdf, Jul. 19, 2017, International Journal of Computational Intelligence Research, 10 pgs.

Desjardins, Guy and Godin, Robert, Combining Relevance Feedback and Genetic Algorithms in an Internet Information Filtering Engine, https://researchgate.net/profile/Robert_Godin/publication/221509864_Combining_Relevance_Feedback_and_Genetic_AI, Mar. 1, 2000, ResearchGate, 10 pgs.

* cited by examiner

SYSTEM AND METHODS FOR SEARCH ENGINE PARAMETER TUNING USING GENETIC ALGORITHM

FIELD OF THE DISCLOSURE

This disclosure is generally directed to search engines, including search parameter weight tuning for search engines.

BACKGROUND OF RELATED ART

Search engines generally receive a query from a user, evaluate a set of documents for relevance to that query, rank a subset of the documents based on relevance, and present the ranked subset of documents to the user responsive to the query. To rank the documents that are responsive to the query, the search engine weighs the relevance of different aspects of the documents to the query based on parameter weights of the search engine. In traditional search engines, the weights of the various search engine parameters are set and tuned through a manual, trial-and-error process.

SUMMARY

An example method for operating an electronic document search engine by setting respective weights of a plurality of search parameters in the search engine may include determining a multi-dimensional search parameter space comprising a set of possible weight values for each of the plurality of search parameters and dividing the search parameter space into a grid of evenly-spaced values that is a subset of the set of possible values. The method may further include defining one or more initial populations of search parameter weight values, wherein each population of search parameter weight values comprises a plurality of initial individuals, wherein each initial individual comprises a respective one of the evenly-spaced values for each of the search parameters. The method may further include executing one or more genetic algorithms based on the one or more initial populations to select a final set of search parameter weight values, and returning results of a user search in the search engine according to the final set of search parameter weight values.

An example method for operating an electronic document search engine by setting respective weights of a plurality of search parameters in the search engine may include determining a multi-dimensional search parameter space comprising a set of possible weight values for each of the plurality of search parameters and defining one or more initial populations of search parameter weight values, wherein each initial population of search parameter weight values comprises a plurality of individuals, wherein each individual comprises a respective one of the values for each of the search parameters, and executing one or more genetic algorithms based on the one or more initial populations to select a final set of search parameter weight values. The method may further include returning results of a user search in the search engine according to the final set of search parameter weight values, wherein the search parameters comprise metadata fields that are associated with the set of documents independent of the search engine.

A method for operating an electronic document search engine by setting respective weights of a plurality of search parameters in the search engine may include determining a multi-dimensional search parameter space comprising a set of possible weight values for each of the plurality of search parameters and defining one or more populations of search parameter weight values, wherein each population of search parameter weight values comprises a plurality of individuals, wherein each individual comprises a respective one of the evenly-spaced values for each of the search parameters. The method may further include executing one or more genetic algorithms based on the one or more populations to select a final set of search parameter weight values, wherein executing one or more genetic algorithms based on the one or more populations comprises executing an evolution step, the evolution step comprising creating a child individual comprising new values for each of the search parameter weights, wherein the new value for each one of the search parameter weights is selected from a range of values between a value of a first parent individual for that weight and a value of a second parent individual for that weight. The method may further include returning results of a user search in the search engine according to the final set of search parameter weight values.

DETAILED DESCRIPTION

An electronic document search engine may be improved by tuning—i.e., optimizing—the search parameter weights of the engine based on historical search data. In some embodiments, the parameters weights of a search engine may be tuned according to a process that applies one or more genetic algorithms to the set of possible search parameter weights to determine an optimal set of search parameter weights. Aspects of applying one or more genetic algorithms for tuning search parameter weights will be described with respect to FIGS. 3, 4, and 5. First, with respect to FIGS. 1 and 2, general functionality of a search engine system will be described to provide context for the inventive methodology of the instant disclosure.

Figure 1:
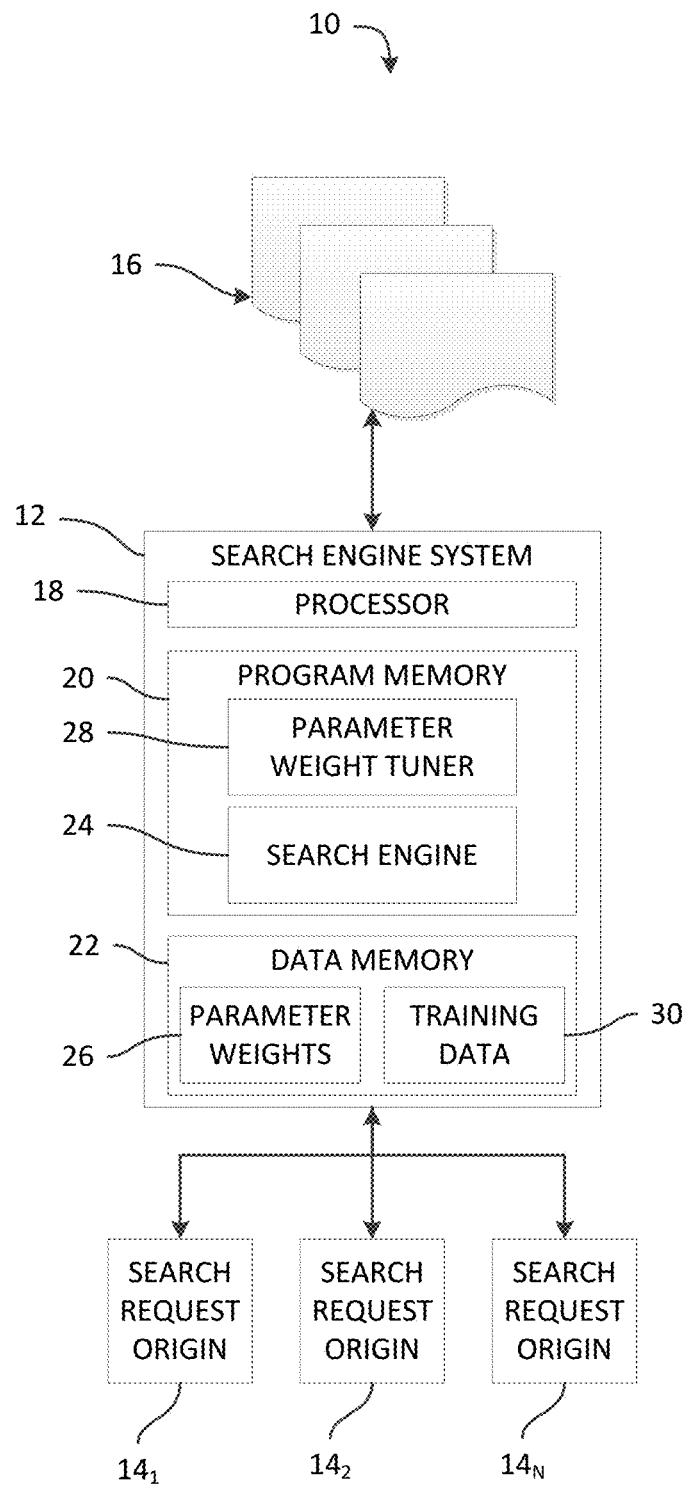
FIG. 1 is a diagrammatic view of an example system for operating an electronic document search engine.

FIG. 1 is a diagrammatic view of an example system 10 for operating a search engine. The system 10 may include a search engine system 12 configured to receive search requests from one or more search request origins $14_1$, $14_2$, ... $14_N$ (which may be referred to individually as a search request origin 14 or collectively as the search request origins 14) to search a set of documents 16, and to return a ranked subset of responsive documents to the origin 14 of a given search request. The search request origins 14 may be personal computers, mobile computing devices, or other end user computing devices, in an embodiment.

The documents 16 may be web pages on a website associated with the search engine system 12, in an embodiment. For example, the documents 16 may be product listing pages in an e-commerce website, and the search engine system 12 may be deployed for searching that website, in an embodiment. In other embodiments, the documents 16 may be other types of electronic documents. For example, the documents 16 may be a broader set of web pages or other documents indexed on the internet and the search engine system may be deployed for searching the internet, in an embodiment.

The search engine system 12 may include a processor 18, a program memory 20, and a data memory 22. The processor 18 may be configured to execute computer-executable instructions stored in the program memory 20 so as to perform one or more of the steps, methods, algorithms, etc. of this disclosure.

The program memory 20 may include a search engine 24 for receiving a search request from a search request origin 14, searching the set of documents 16 for responsive documents, and returning a ranked set of responsive documents to the origin 14 of the search request. The search engine 24 may apply a set of search parameter weights 26 stored in the data memory 22 in order to determine the relevance of each document in the document set 16.

The program memory 20 may further include a parameter weight tuner 28 configured to tune (i.e., set or alter) the parameter weights 26 in order to provide an improved set of search results to future search requests with the search engine 24. The parameter weight tuner 28 may apply one or more genetic algorithms to a set of training data 30 (stored in the data memory 22) in order to determine an optimized set of parameter weights 26.

FIG. 1 illustrates an embodiment in which the search engine 24 and the parameter weight tuner 28 are executed on the same computing apparatus. This combination is for ease of description only. A person of skill in the art will appreciate that a search engine 24 may be executed on computing resources independent of those used to set or tune the search parameter weights 26 applied by the search engine 24.

In an embodiment, the documents 16 may be associated with one or more types of native metadata, i.e., metadata that is independent of the search engine 24. In an embodiment, the structure and types of metadata natively associated with the documents 16 are known to the search engine. Accordingly, the search parameter weights 26 may include weights for metadata natively associated with the documents 16, in an embodiment. Certain aspects of the instant disclosure may be particularly advantageous in such a structured environment, but the instant disclosure is not limited to such an environment.

As noted above, the documents 16 may include, for example, product pages respectively associated with one or more products available for sale on an e-commerce website. The search engine system 12 may be associated with the proprietor of the e-commerce website, in an embodiment. The metadata natively associated with the documents may include information that is associated with the one or more products by a back-end inventory management system, in an embodiment. For example, native metadata may include a product category or sub-category with which the product is associated (e.g., in a product hierarchy that is proprietary to the retailer and may not be reflected in the text of the document), data respective of stock or inventory of the product, either for online purchase or purchase in a brick-and-mortar store, a unique identifier associated with an image of the product, and the like, in an embodiment.

In addition to native metadata associated with the documents 16, the search parameter weights 26 may also include weights for various aspects of the contents of the documents 16 such as, for example, product name, product manufacturer, product description, product dimensions, product color, etc.

The training data 30 may be based on prior use and activity of the search engine 24, in an embodiment. For example, the training data 30 may include prior searches queries, prior results of the search engine 24 to those search queries, and user behavior data respective of the prior results. Such user behavior data may include, for example, records of which results were selected by users responsive to which searches (under the assumption that a user-selected document is the "correct" result of a given search, in an embodiment). The training data 30 may be used to assess the quality of potential sets of parameter weights, as will be described later in this disclosure.

Figure 2:
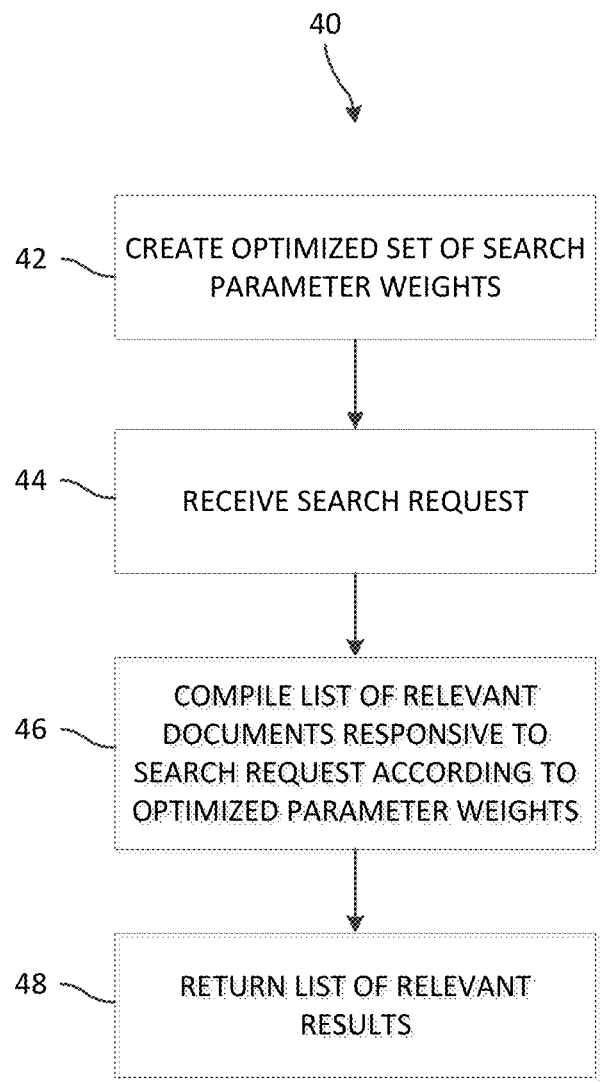
FIG. 2 is a flow chart illustrating an example method for operating an electronic document search engine system.

FIG. 2 is a flow chart illustrating an example method 40 of operating a search engine system, such as the search engine system 12 of FIG. 1, for example. For ease of description, the method 40 of FIG. 2 will be described with reference to the system 10 of FIG. 1.

The method 40 may begin with a step 42 in which the search engine system 12 (i.e., the parameter weight tuner 28) creates an optimized set of parameter weights 26 and stores the optimized set of parameter weights 26 in the data memory 22. The search engine system 12 may create an optimized set of search parameter weights 26 by, for example, applying a one or more genetic algorithms to a set of training data 30. Example methods of applying one or more genetic algorithms, including a modified genetic algorithm, to create an optimized set of search parameter weights will be described with respect to FIGS. 3, 4, and 5.

The method 40 may further include a step 44 in which the search engine system 12 receives a search request from a search request origin 14. The method 40 may further include a step 46 in which the search engine 24 compiles a list of relevant results for the search request, including a ranked list of responsive documents from the documents set 16, for example. The search engine 24 may compile the list according to the optimized set of parameter weights 26 created in step 42. That is, the search engine 24 may determine the relevance of each document to the query, in each parameter, and may weigh the contribution of each parameter to the overall relevance of the document according to the parameter weight values 26.

The method 40 may further include a step in which the search engine system 12 returns the list of relevant results to the search request origin 14. The relevant results may be provided in a ranked list, from most-to-least relevant, in an embodiment. The relevant results may be a subset of the total set of documents, in an embodiment.

Figure 3:
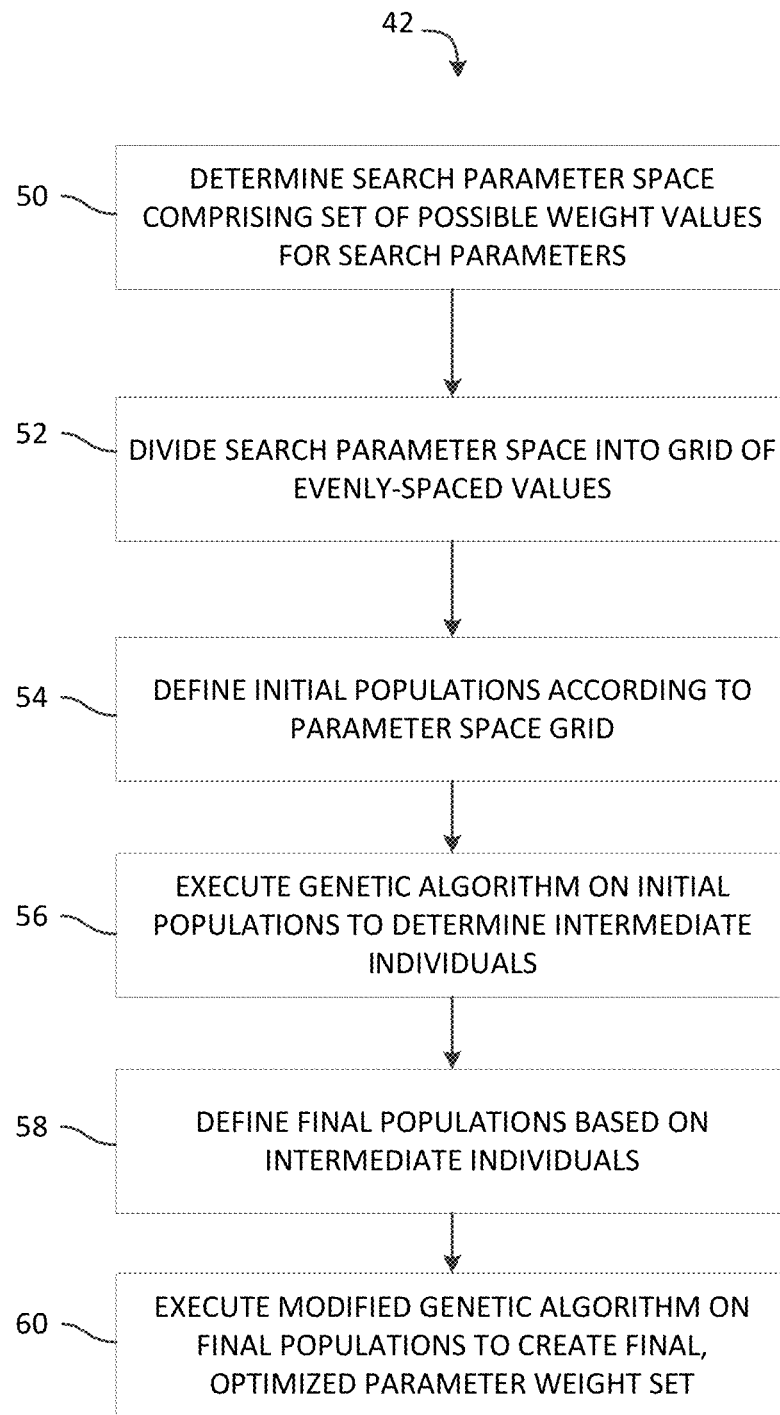
FIG. 3 is a flow chart illustrating an example method for setting search parameter weights for a search engine.

FIG. 3 is a flow chart illustrating an example method 42 of setting search parameter weights for a search engine (which may find use as step 42 in the method of FIG. 2). For ease of description, the method 42 of FIG. 3 will be described with reference to the system of FIG. 1.

The method 42 of FIG. 3 may begin with a step 50 of determining a search parameter space comprising the set of possible weight values for the search engine search parameters. For example, if the search engine 24 applies five parameters, the determining step 50 may include determining all possible values for those five parameters.

The method 42 may further include a step 52 of dividing the search parameter weight space (determined in step 50) into a grid of evenly-spaced values. That is, for each search parameter, the set of possible weight values may be reduced into a subset of evenly-spaced values that collectively covers the parameter space, in an embodiment. For example, in an embodiment, the weight of a given parameter may be between zero and one, and the grid may include a discrete number of values between zero and one (inclusive or non-inclusive) for each parameter weight. In an embodiment, each parameter weight value range may be divided into a number of values equal to the number of individuals that will be defined in the following step. For example, if five separate populations are created, each with ten individuals in the following step, then each parameter weight range may be divided into fifty equally-spaced values.

By reducing the set of possible parameter weight values to a smaller subset before further processing, the method 42 may advantageously reduce the processing resources needed for the method (and relative to known genetic algorithms for optimizing a set of values), thereby improving the function of the computer on which the method is executed.

The method 42 may further include a step 54 of defining one or more initial populations of search parameter weight values according to the parameter weight grid. Each population may include a plurality of initial individuals, and each initial individual may comprise a respective one of the evenly-spaced values (defined in step 52) for each of the search parameters. In an embodiment, individuals may be defined by selecting, for each of a desired number of individuals, a random value for each search parameter from the subset of evenly-spaced values. In another embodiment, individuals may be defined by systematically assigning each possible combination of the evenly-spaced values to an individual, or otherwise systematically assigning values to individuals. The number of individuals may be defined to be large enough to adequately cover the parameter space, in an embodiment. Multiple populations may be defined, in an embodiment. As known in the art, the populations may generally be treated separately (e.g., in an evolution step, as will be described later in this disclosure), but individuals may be transferred from one population to another (e.g., in a migration step, as will be described later in this disclosure).

The method 42 may further include a step 56 of executing a genetic algorithm on the one or more initial populations to determine an intermediate set of individuals. The genetic algorithm executed on the initial populations may be a traditional genetic algorithm, as known in the art. An example traditional genetic algorithm will later be briefly described with reference to FIG. 4. The traditional genetic algorithm may be executed to arrive at a desired number of intermediate individuals that represent the combinations of parameter weight values in the grid that are most likely to be optimal search parameter weights after further refining. Such intermediate individuals may be considered "hotspots" of the search parameter grid created in step 52.

The method 42 may further include a step 58 of defining one or more final populations based on the intermediate individuals. The final populations may include a plurality of individuals, each including parameter weights that are collectively normally distributed around the hotspots, i.e., the intermediate individuals. The intermediate individuals themselves may or may not be included in the final populations, depending on the embodiment.

The method 42 may further include a step 60 of executing a modified genetic algorithm on the final populations to create the final, optimized parameter weight set. An example modified genetic algorithm will be described with respect to FIG. 5.

Figure 4:
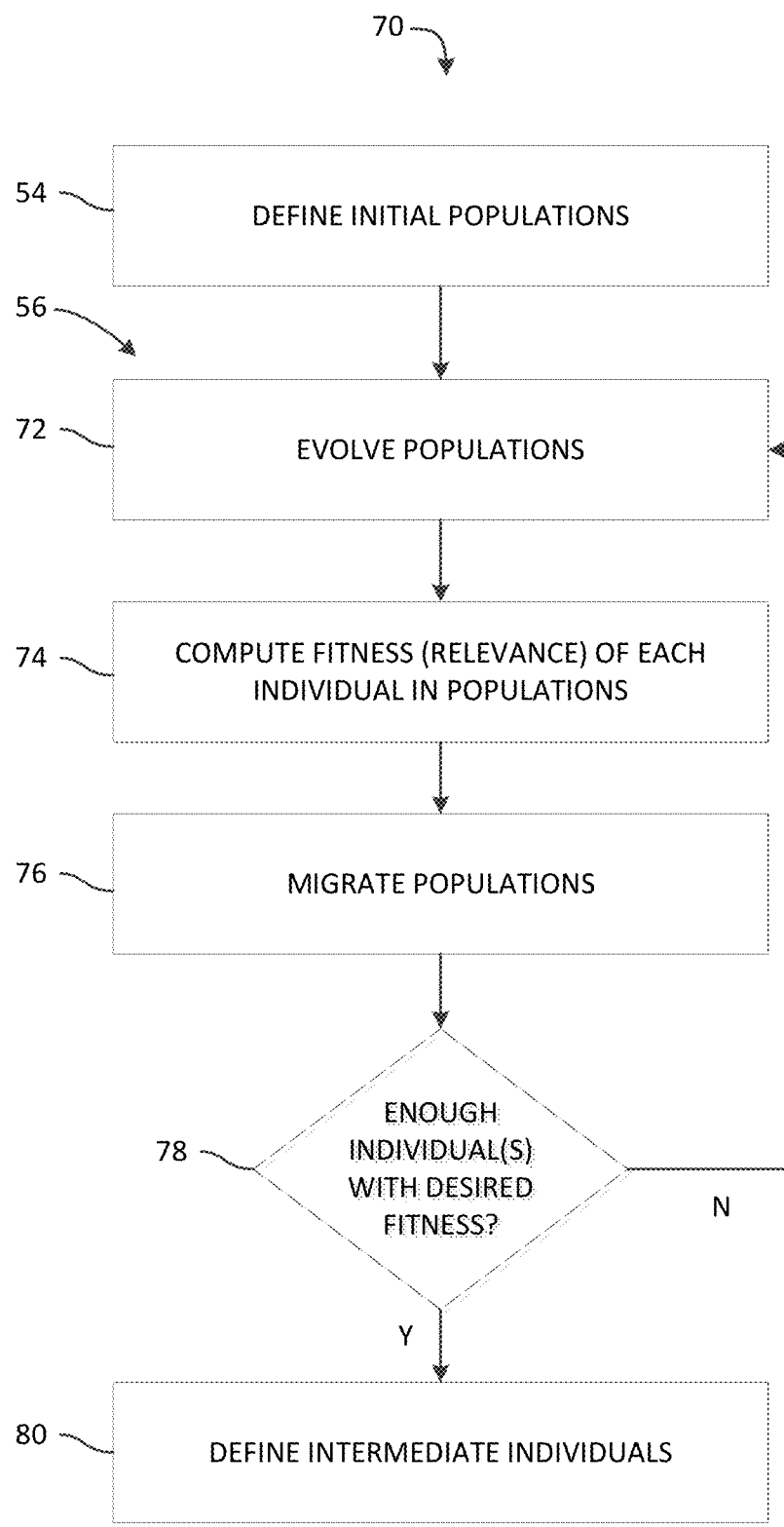
FIG. 4 is a flow chart illustrating an example method of a traditional genetic algorithm that may find use in the method of FIG. 3.

FIG. 4 is a flow chart illustrating an example method 70 of executing a traditional genetic algorithm that may find use, for example, in the method 42 of FIG. 3. Traditional genetic algorithms are known in the art. Accordingly, the method of FIG. 4 will only be briefly described. Portions of the method—i.e., steps 72, 74, 76, 78, and 80—may find use as step 56 of the method 42 of FIG. 3.

The method 70 may first include a step 54 that includes defining one or more populations for the genetic algorithm. As noted above with respect to FIG. 3, in an embodiment, a population may be defined to include a plurality of individuals, and each individual may include a value for each search parameter weight that is either randomly or systematically selected from a set or subset of available search parameter weight values. Multiple populations may be defined, in an embodiment. As known in the art, the populations may generally be treated separately (e.g., in an evolution step), but individuals may be transferred from one population to another (e.g., in a migration step).

The method 70 may further include a step 72 that includes, for each of the one or more populations, evolving the population. As known in the art, evolving a population may include, one or more times, selecting a first individual of the population as a first parent, selecting a second individual of the population as a second parent, and then creating a child based on the first parent and the second parent. A parent may be selected, in an embodiment, by first selecting a subset of the population, and then selecting the highest-fitness individual from that subset of the population. The subset may be selected at random, in an embodiment. A child may be created based on the first parent and the second parent by selecting, for each parameter weight, either the first parent's value or the second parent's value. The selection may be random, in an embodiment.

The evolution step 72 may include creating a predetermined number of children, each with its own unique pair of parents, in an embodiment, and adding those children to the population. The number of children may be set to any appropriate number based on available computing resources, time, and a desired fitness, as is known in the art. In an embodiment, the child "generation" may completely replace the "parent" generation in a population. As such, an in embodiment, the evolution step 72 may include deleting the individuals comprising the parent generation after a sufficient number of children have been created.

In an embodiment, evolution occurs within a single population—that is, parents for each child are selected from the same population. In an embodiment in which multiple populations are defined, each population may have its own evolution, with the multiple populations evolving in parallel.

The method 70 may further include a step 74 of computing the fitness of each individual in the populations. The "fitness" of an individual, as used in this disclosure, refers to the likelihood that the search parameter weights of that individual, if applied by the search engine, will lead to the most relevant search results.

Referring to FIGS. 1 and 4, the fitness of an individual may be computed at step 74 based on the training data 30. As noted above, the training data 30 may include prior search queries, prior results of the search engine to the search queries, and user behavior data respective to the prior results in the search engine 24. To compute the fitness of an individual, one or more of the prior search queries may be run on the search engine 24 using the parameter weight values of the individual, each of which will result in a subset of the documents 16. The fitness of that individual may then be determined based on how often the top one or more results of the search were actually selected by a user, based on the user behavior data in the training data 30. For example, if the document set 16 consists of ten documents, numbered 1-10, and a given individual results in document number four being the top result for a given search, the fitness of that individual may be how often a user actually selected document number four responsive to actual results (in the training data) for the given search. In an embodiment, to assess an individual's overall fitness, a plurality of searches from the training data 30 may be run on the search engine 24 with the individual's parameter weights, and the results of each search may be evaluated as described above. The overall fitness of an individual may then be determined, in an embodiment, by applying a mathematical analysis to the collective search results. For example, in an embodiment, a discounted cumulative gain (a measure of the collective relevance of the set of search results) and an ideal discounted cumulative gain (a measure of the ideal collective relevance of documents available for response to a search) (both of which mathematical techniques are known in the art) may be calculated for the searches run with based on the individual, and the discounted cumulative gain may be compared to the ideal discounted cumulative gain. For example in an embodiment, fitness may be defined as a ratio of the discounted cumulative gain to the ideal discounted cumulative gain with respect to a particular individual.

The method 70 may further include a step 76 that includes migrating the populations. In an embodiment, migrating the populations may include shifting individuals from one population to another, to promote "diversity" within each population. For example, in an embodiment, the most-fit individuals from each population may be randomly redistributed among the other populations.

The method 70 may further include a step 78 of querying whether enough individuals in the populations have a fitness that is as high as desired. If enough individuals in the populations have a fitness that is as high as desired, the method 70 may advance to a step 80 of defining those individuals as intermediate individuals, which serve as the basis for final processing of the method 70. In an embodiment in which the initial populations are defined according to an evenly-spaced grid of the parameter weight space, the intermediate individuals may be considered the "hotspots" of the grid.

Figure 5:
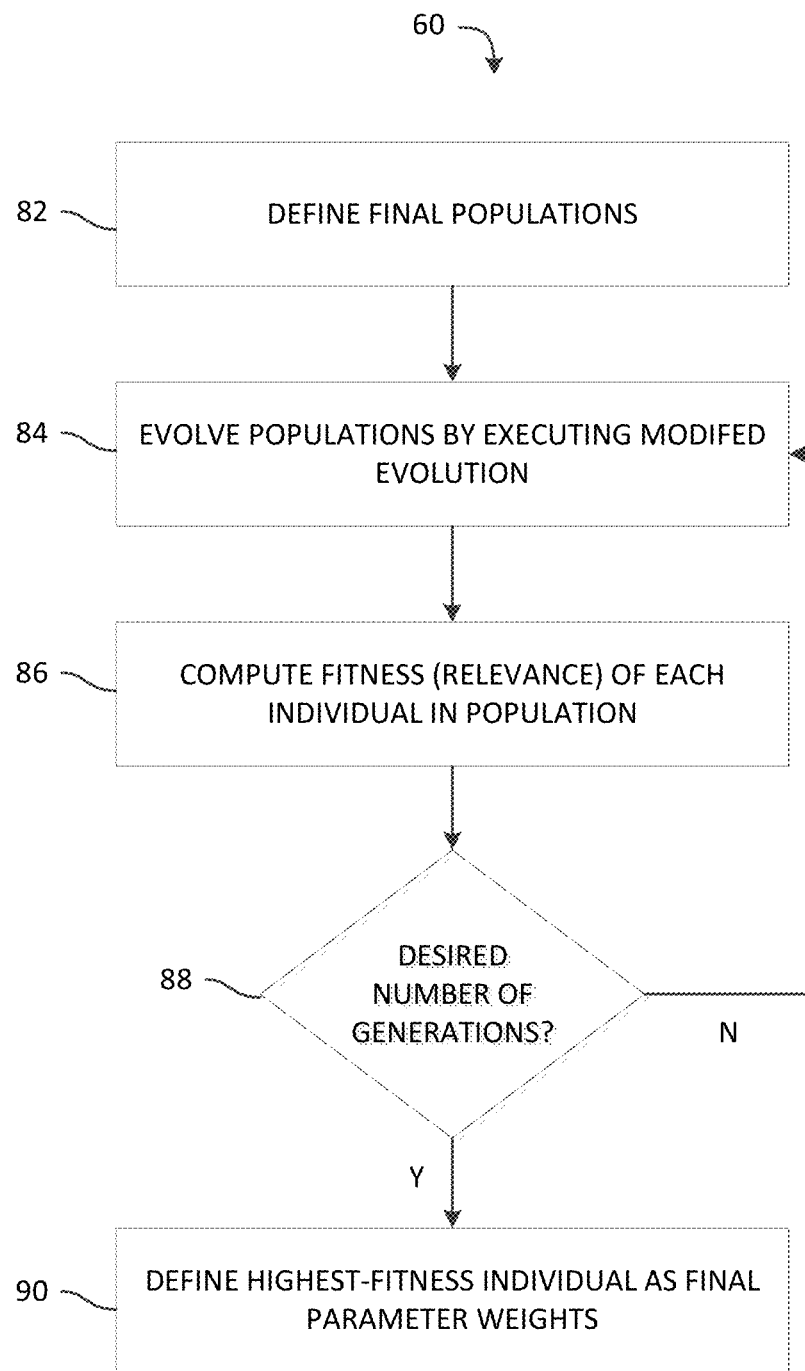
FIG. 5 is a flow chart illustrating an example method of a modified genetic algorithm that may find use in the method of FIG. 3.

FIG. 5 is a flow chart illustrating an example method 60 of executing a modified genetic algorithm that may find use, for example, in the method 42 of FIG. 3 (i.e., as step 60 in the method 42).

Referring to FIG. 5, the method 60 may include a step 82 of defining one or more final populations. The final populations may be defined according to a set of intermediate individuals, in an embodiment. For example, as noted above with respect to FIG. 4, an intermediate set of individuals may be defined that are the "hotspots" of a grid of the parameter weight space. The final populations may be defined to include a plurality of new individuals that are uniformly distributed around the hotspots, in an embodiment.

The method 60 may further include a step 84 of evolving the final populations by executing a modified evolution on the final populations. Like the traditional evolution step 72 described above with respect to FIG. 4, the modified evolution step 84 may include selecting parents from the populations and creating children based on those parents. The evolution step 84 is modified from a traditional evolution because the manner in which the characteristics of a child are derived from the characteristics of the child's parents is different from a traditional evolution. As described above, in a normal evolution, the child's characteristics are selected from the parent's characteristics in a binary fashion.

For example, if a first parent has a weight of 0.2 for a given parameter, and a second parent has a weight of 0.8, then in a normal evolution, the child would have a value of either 0.2 or 0.8 for that parameter weight. In the modified evolution step, however, the child is assigned a weight value that is on the continuum between the weight values of the parents. Thus, in the modified evolution step 84, if a first parent has a weight of 0.2 for a given parameter, and a second parent has a weight of 0.8, the child could have any value between 0.2 or 0.8 (inclusive or non-inclusive, depending on the embodiment) for that parameter weight. The modified evolution step 84 may offer an improvement over a traditional evolution by providing increased "genetic diversity."

The modified evolution step 84 may include creating a predetermined number of children, in an embodiment, and adding those children to the population. The number of children may be set to any appropriate number based on available computing resources, time, and a desired fitness, as is known in the art.

The method 60 may further include a step 86 of computing the fitness of each individual in the final populations. The fitness may be computed substantially as described above with respect to step 74 in the method 70 of FIG. 4, above.

The evolution and computing steps 84, 86 may be repeated for a predetermined number of "generations", i.e., iterations, based on a query step 88. The number of generations may be any desired number based on available computing resources, time, and a desired fitness, as is known in the art.

Once the desired number of generations has been reached, the final parameter weights may be defined at step 90 to be the parameter weights associated with the highest-fitness individual remaining in the populations.

Determining search parameter weights according to the present disclosure offers numerous advantages over known methods and systems. First, tuning search parameters according to a genetic algorithm, instead of manually, provides more consistently relevant search results. Second, by accounting for native metadata in the search parameters, the methods of the instant disclosure may be implemented in a structured environment so as to take advantage of the information available in that environment that may be known to the search engine before searching. Third, by reducing the (generally very large) set of possible parameter weights to a grid that covers the parameter weight space, the methods of the instant disclosure reduce the computational cost of tuning search parameters while still ensuring that the entire search parameter space is considered. Fourth, by employing a modified evolution step, the methods of the instant disclosure provide increased performance over known evolution algorithms.

Figure 6:
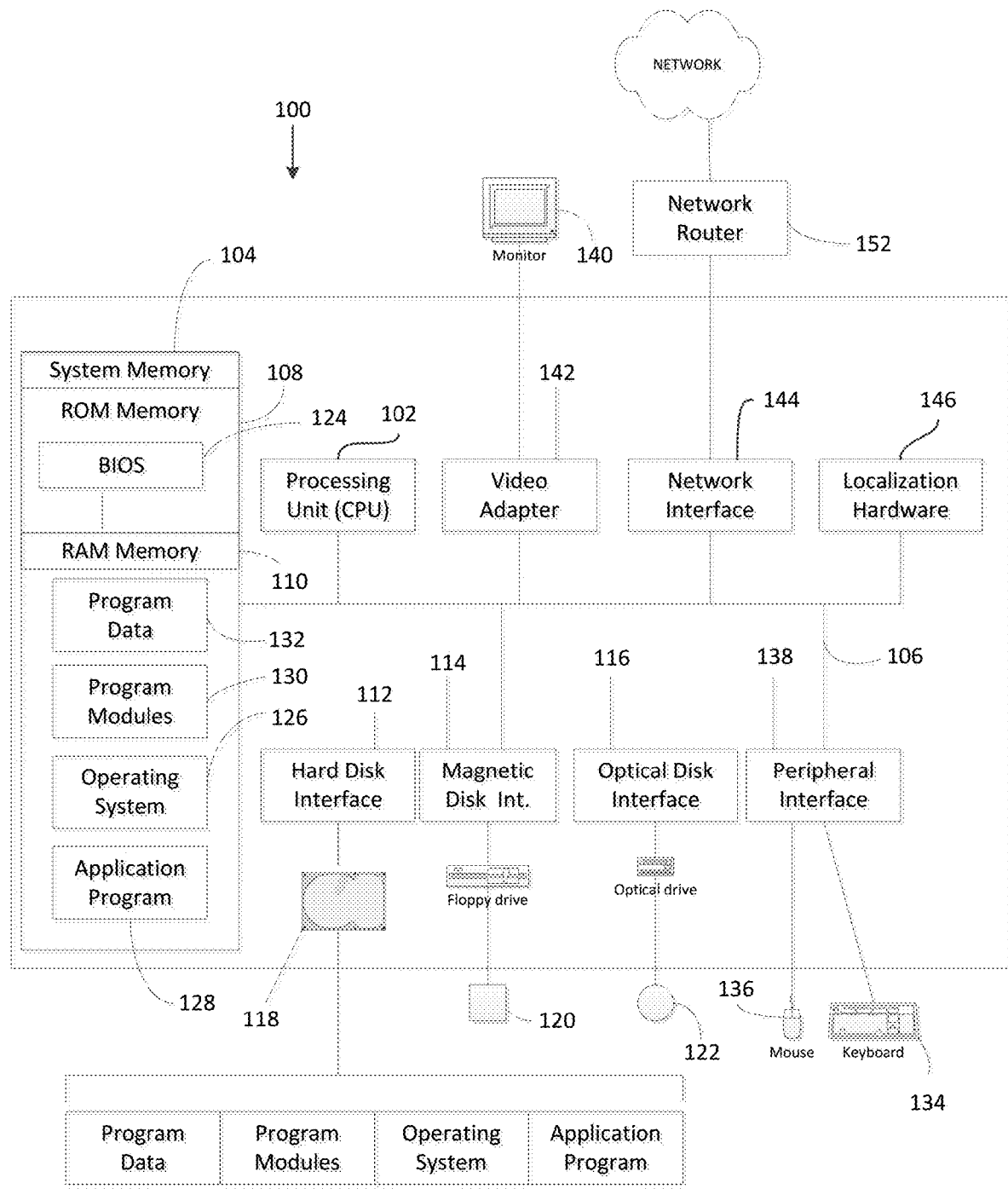
FIG. 6 is a diagrammatic view of an illustrative computing system that includes a general purpose computing system environment that may find use in various aspects of the system of FIG. 1.

FIG. 6 is a diagrammatic view of an illustrative computing system that includes a general purpose computing system environment 100, such as a desktop computer, laptop, smartphone, tablet, or any other such device having the ability to execute instructions, such as those stored within a non-transient, computer-readable medium. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 106, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 190, such as during start-up, may be stored in ROM 108. Similarly, RAM 110, hard drive 118, and/or peripheral memory devices may be used to store computer executable instructions comprising an operating system 126, one or more applications programs 128 (such as the search engine and/or search parameter weight tuning processes disclosed herein), other program modules 130, and/or program data 132. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 142. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 146 for determining a location of the computing system environment 100. In embodiments, the localization hardware 146 may include, for example only, a GPS antenna, an RFID chip or reader, a WiFi antenna, or other computing hardware that may be used to capture or transmit signals that may be used to determine the location of the computing system environment 190.

The computing environment 100, or portions thereof, may comprise one or more of the request origins of FIG. 1. Additionally, or alternatively, the components of the computing environment 100 may comprise embodiments of the search engine system of FIG. 1.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for operating an electronic document search engine by setting respective weights of a plurality of search parameters in the search engine, the method comprising:
    determining a multi-dimensional search parameter space comprising a set of possible weight values for each of the plurality of search parameters;
    dividing the search parameter space into a grid of evenly-spaced values that is a subset of the set of possible values;
    defining one or more initial populations of search parameter weight values, wherein each population of search parameter weight values comprises a plurality of initial individuals, wherein each initial individual comprises a set of search parameter weight values, each set comprising a respective one of the evenly-spaced values for each of the search parameters;
    executing one or more genetic algorithms based on the one or more initial populations to select a final set of search parameter weight values, wherein executing one or more genetic algorithms based on the one or more initial populations comprises:
        executing an evolution step, the evolution step comprising creating a plurality of children individuals, each child individual comprising new values for each of the search parameter weights, each child individual based on a respective first parent individual and second parent individual, wherein the new value for each one of the search parameter weights is selected from a range of values between a value of the respective first parent individual for that weight and a value of the respective second parent individual for that weight, wherein each parent individual is a respective one of the initial individuals; and
        computing a fitness of each initial individual of the one or more initial populations based on historical selections by a plurality of users in response to previous searches, wherein computing a fitness of each initial individual comprises measuring how often the plurality of users selected one or more documents returned by the initial individual in each of a plurality of searches; and
    returning results of a user search in the search engine according to the final set of search parameter weight values.

2. The method of claim 1, wherein the search parameters comprise metadata fields that are associated with the set of documents independent of the search engine.

3. The method of claim 1, wherein executing the one or more genetic algorithms based on the one or more populations comprises:
    executing a first genetic algorithm on the one or more initial populations to select an intermediate set of individuals;
    defining a final population based on the intermediate set of individuals; and
    executing a second genetic algorithm on the final population to select the final set of search parameter weight values.

4. The method of claim 3, wherein executing the second genetic algorithm on the final population comprises:
    executing an evolution step in which a first individual in the final populations is defined as a first parent and a second individual in the final population is defined as a second parent, by creating a child individual comprising new values for each of the search parameter weights, wherein the new value for each one of the search parameter weights is selected from the range of values between the value of the first parent for that weight and the value of the second parent for that weight.

5. The method of claim 4, wherein executing the first genetic algorithm on the one or more populations comprises:
    executing an evolution step in which a first individual in one of the one or more initial populations is defined as a first parent and a second individual in the one of the one or more initial population is defined as a second parent, by creating a child individual comprising new values for each of the search parameter weights, wherein the new value for each one of the search parameter weights is selected from the value of the first parent for that weight and the value of the second parent for that weight.

6. The method of claim 1, wherein measuring how often the plurality of users selected one or more documents returned by the initial individual in each of a plurality of searches comprises executing the plurality of searches from training data according to the initial individual.

7. A system for operating an electronic document search engine by setting respective weights of a plurality of search parameters in the search engine, the system comprising:
    a processor; and
    a non-transitory, computer-readable memory storing instructions that, when executed by the processor, cause the system to perform operations comprising:
        determining a multi-dimensional search parameter space comprising a set of possible weight values for each of the plurality of search parameters;
        dividing the search parameter space into a grid of evenly-spaced values that is a subset of the set of possible values;
        defining one or more initial populations of search parameter weight values, wherein each population of search parameter weight values comprises a plurality of initial individuals, wherein each initial individual comprises a set of search parameter weight values, each set comprising a respective one of the evenly-spaced values for each of the search parameters;
        executing one or more genetic algorithms based on the one or more initial populations to select a final set of search parameter weight values, wherein executing one or more genetic algorithms based on the one or more initial populations comprises:
    executing an evolution step, the evolution step comprising creating a plurality of children individuals, each child individual comprising new values for each of the search parameter weights, each child individual based on a respective first parent individual and second parent individual, wherein the new value for each one of the search parameter weights is selected from a range of values between a value of the respective first parent individual for that weight and a value of the respective second parent individual for that weight, wherein each parent individual is a respective one of the initial individuals; and
    computing a fitness of each initial individual of the one or more initial populations based on historical selections by a plurality of users in response to previous searches, wherein computing a fitness of each initial individual comprises measuring how often the plurality of users selected one or more documents returned by the initial individual in each of a plurality of searches; and
    returning results of a user search in the search engine according to the final set of search parameter weight values.

8. The system of claim 7, wherein the search parameters comprise metadata fields that are associated with the set of documents independent of the search engine.

9. The system of claim 7, wherein executing the one or more genetic algorithms based on the one or more populations comprises:
    executing a first genetic algorithm on the one or more initial populations to select an intermediate set of individuals;
    defining a final population based on the intermediate set of individuals; and
    executing a second genetic algorithm on the final population to select the final set of search parameter weight values.

10. The system of claim 9, wherein executing the second genetic algorithm on the final population comprises:
    executing an evolution step in which a first individual in the final populations is defined as a first parent and a second individual in the final population is defined as a second parent, by creating a child individual comprising new values for each of the search parameter weights, wherein the new value for each one of the search parameter weights is selected from the range of values between the value of the first parent for that weight and the value of the second parent for that weight.

11. The system of claim 10, wherein executing the first genetic algorithm on the one or more populations comprises:
    executing an evolution step in which a first individual in one of the one or more initial populations is defined as a first parent and a second individual in the one of the one or more initial population is defined as a second parent, by creating a child individual comprising new values for each of the search parameter weights, wherein the new value for each one of the search parameter weights is selected from the value of the first parent for that weight and the value of the second parent for that weight.

12. The system of claim 7, wherein measuring how often the plurality of users selected one or more documents returned by the initial individual in each of a plurality of searches comprises executing the plurality of searches from training data according to the initial individual.

13. A non-transitory, computer-readable memory storing instructions that, when executed by a processor, cause a computing system comprising the processor to perform operations comprising:
    determining a multi-dimensional search parameter space comprising a set of possible weight values for each of the plurality of search parameters;
    dividing the search parameter space into a grid of evenly-spaced values that is a subset of the set of possible values;
    defining one or more initial populations of search parameter weight values, wherein each population of search parameter weight values comprises a plurality of initial individuals, wherein each initial individual comprises a set of search parameter weight values, each set comprising a respective one of the evenly-spaced values for each of the search parameters;
    executing one or more genetic algorithms based on the one or more initial populations to select a final set of search parameter weight values, wherein executing one or more genetic algorithms based on the one or more initial populations comprises:
        executing an evolution step, the evolution step comprising creating a plurality of children individuals, each child individual comprising new values for each of the search parameter weights, each child individual based on a respective first parent individual and second parent individual, wherein the new value for each one of the search parameter weights is selected from a range of values between a value of the respective first parent individual for that weight and a value of the respective second parent individual for that weight, wherein each parent individual is a respective one of the initial individuals; and
        computing a fitness of each initial individual of the one or more initial populations based on historical selections by a plurality of users in response to previous searches, wherein computing a fitness of each initial individual comprises measuring how often the plurality of users selected one or more documents returned by the initial individual in each of a plurality of searches; and
    returning results of a user search in the search engine according to the final set of search parameter weight values.

14. The non-transitory, computer-readable memory of claim 13, wherein the search parameters comprise metadata fields that are associated with the set of documents independent of the search engine.

15. The non-transitory, computer-readable memory of claim 13, wherein executing the one or more genetic algorithms based on the one or more populations comprises:
    executing a first genetic algorithm on the one or more initial populations to select an intermediate set of individuals;
    defining a final population based on the intermediate set of individuals; and
    executing a second genetic algorithm on the final population to select the final set of search parameter weight values.

16. The non-transitory, computer-readable memory of claim 15, wherein executing the second genetic algorithm on the final population comprises:

executing an evolution step in which a first individual in the final populations is defined as a first parent and a second individual in the final population is defined as a second parent, by creating a child individual comprising new values for each of the search parameter weights, wherein the new value for each one of the search parameter weights is selected from the range of values between the value of the first parent for that weight and the value of the second parent for that weight.

17. The non-transitory, computer-readable memory of claim 16, wherein executing the first genetic algorithm on the one or more populations comprises:

executing an evolution step in which a first individual in one of the one or more initial populations is defined as a first parent and a second individual in the one of the one or more initial population is defined as a second parent, by creating a child individual comprising new values for each of the search parameter weights, wherein the new value for each one of the search parameter weights is selected from the value of the first parent for that weight and the value of the second parent for that weight.

18. The non-transitory, computer-readable memory of claim 13, wherein measuring how often the plurality of users selected one or more documents returned by the initial individual in each of a plurality of searches comprises executing the plurality of searches from training data according to the initial individual.

* * * * *